June 26, 1962  H. ERDMANN  3,040,419
TOOLS FOR ASSEMBLING BOWED OPEN RETAINING
RINGS ON GROOVED SHAFTS AND THE LIKE
Filed April 26, 1960  2 Sheets-Sheet 1
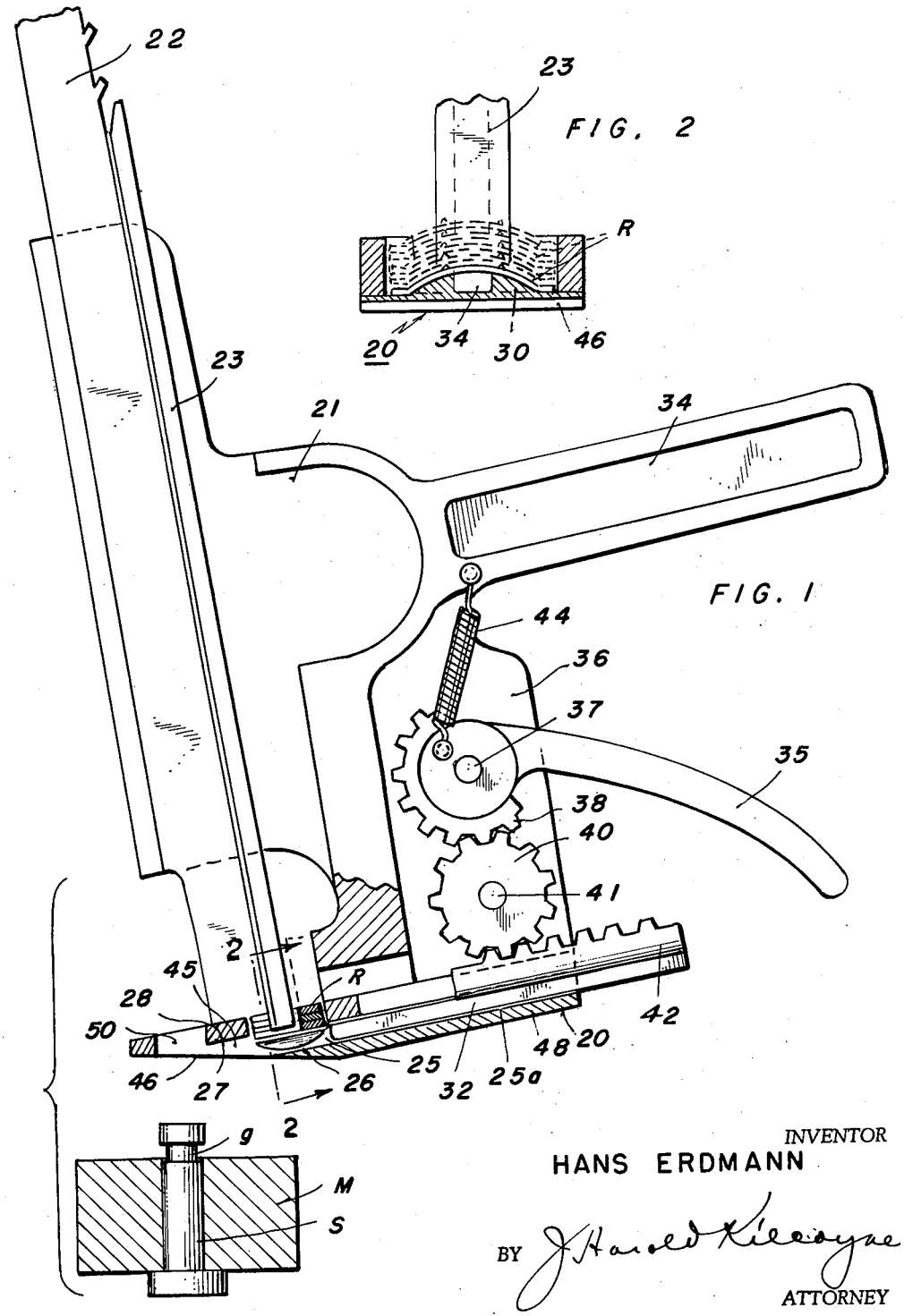
INVENTOR
HANS ERDMANN

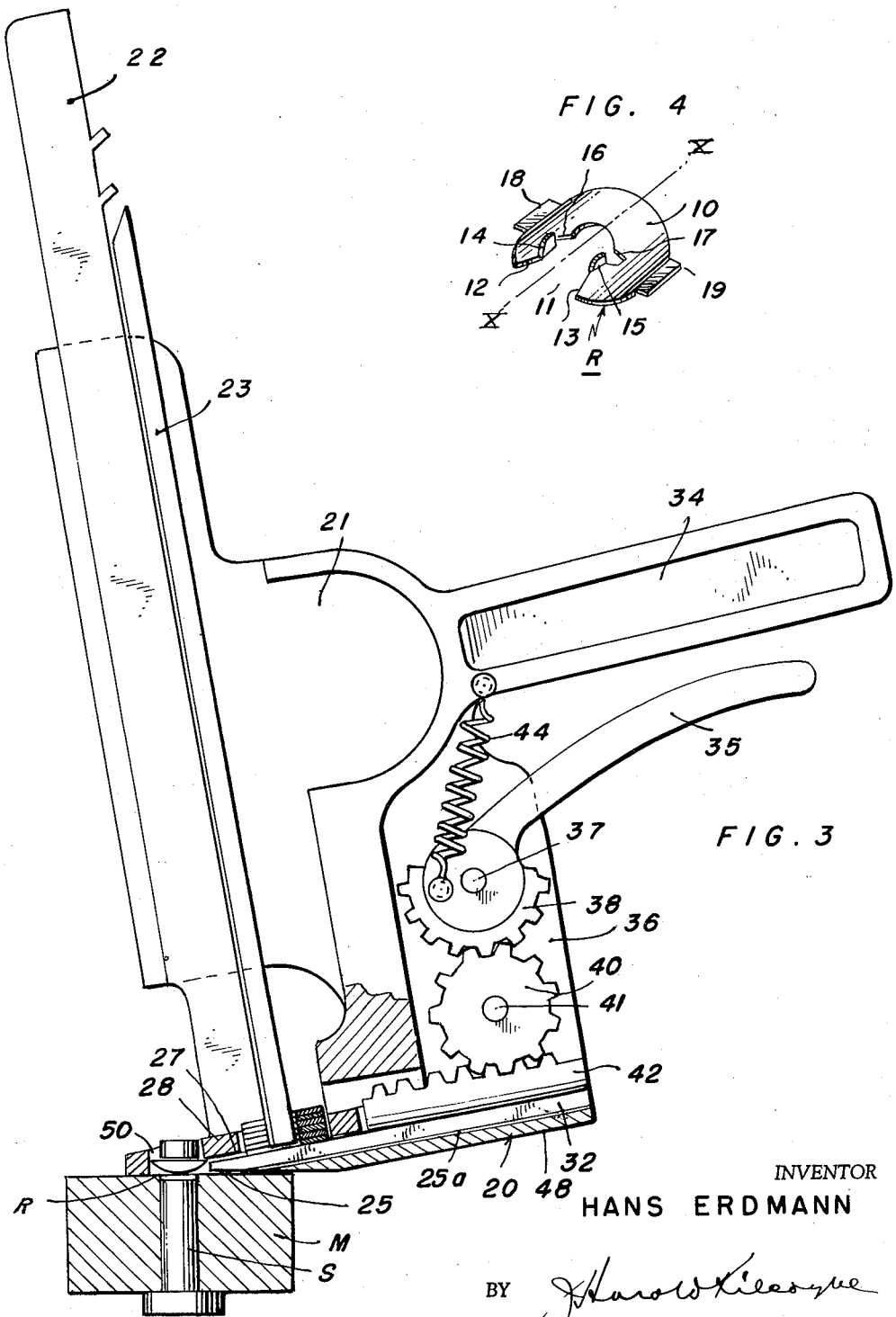

United States Patent Office 3,040,419
Patented June 26, 1962

3,040,419
TOOLS FOR ASSEMBLING BOWED OPEN RETAINING RINGS ON GROOVED SHAFTS AND THE LIKE
Hans Erdmann, Maplewood, N.J., assignor to Waldes Kohinoor, Inc., Long Island City, N.Y., a corporation of New York
Filed Apr. 26, 1960, Ser. No. 24,830
5 Claims. (Cl. 29—212)

This invention relates to improvements in tools for assembling bowed open retaining rings on grooved shafts and the like, and more particularly to a hand-tool type of combination dispensing and applying device for assembling bowed spring retaining rings usually provided with self-locking prongs as disclosed and claimed in Wurzel Patent No. 2,755,698, dated July 24, 1956, in the grooves of shafts and the like on which they are adapted to form artificial locating shoulders for machine parts such as bearings, gears, etc., mounted thereon.

As is now well known, it is difficult if not impossible to assemble, i.e. dispense and apply, bowed open spring retaining rings provided with self-locking prongs according to the aforesaid Wurzel Patent No. 2,755,698 on their shafts by means of the tools and appliances conventionally employed in assembling plane retaining rings on their shafts, because of the presence of the locking prongs and/or the requirement to flatten such rings in the assembly thereof consequent to their unstressed axial dimension due to bowing being greater than the width of the shaft groove in which they are to be assembled. Such has lead to the development of special bowed-ring assembling apparatus, examples of which may be found in my Patent No. 2,900,107, dated August 18, 1959, and copending application Serial No. 747,265, filed July 8, 1958, now Patent No. 2,995,811, dated August 15, 1961. However, while performing satisfactorily, the prior bowed-ring assembling apparatus in general lacks the portability, simple construction and ease of operation of the simple hand-tool type of device now commonly used in assembling plane rings, and it is a principal object of the present invention to provide a simple, practical, easy-to-operate and thoroughly dependable hand tool capable of dispensing and applying bowed open retaining rings on grooved shafts, which compares favorably with the aforesaid commonly used tools designed for the assembly of plane retaining rings.

A more practical object of the invention is the provision of a simple, easy-to-operate tool especially designed for use in assembling bowed open retaining rings on grooved shafts mounting a machine part such as a gear, bearing race, and the like and wherein the assembled ring is adapted to form an artificial shoulder for said machine part, whose construction and arrangement is such that the tool utilizes the end face of said machine part in effecting the required flattening of the ring just prior to its moving into its shaft groove, thus in large measure avoiding the necessity of providing the tool with costly and elaborate ring flattening means as heretofore.

A further object of the invention is the provision of a hand-tool type of device for dispensing and applying bowed open rings on grooved shafts or the like wherein the assembled ring is adapted to form an artificial locating shoulder for a machine part mounted thereon, whose design and construction is such as to cause the ring being ejected (dispensed) to move along a slideway of decreasing depth whereby it is progressively flattened by being compressed in axial direction in its movement therethrough, which slideway is in part defined by the end face of the machine part to be located by said ring upon its assembly having been effected.

The above and other objects of a tool for assembling open bowed spring retaining rings on grooved shafts and the like according to the invention will appear from the following detailed description and accompanying drawings illustrating a preferred physical embodiment thereof, in which:

FIG. 1 is a side elevation, partly in section, of a bowed retaining ring assembling tool as herein proposed, which illustrates the tool in its normal or inactive position approaching the workpiece, i.e., a grooved shaft mounting a machine part on which ring assembly is to be effected;

FIG. 2 is a section through the ring slideway of said tool taken along line 2—2 of FIG. 1;

FIG. 3 is a view of tool and workpiece illustrating the relation assumed by said parts immediately after the tool has effected its assembly operation; and FIG. 4 is a perspectvie view on an enlarged scale of a form of bowed open retaining ring having locking prongs, for the assembly of which the present dispensing and applying tool was especially designed.

Preliminary to describing the tool to which the present invention is addressed, reference is had to FIG. 4 illustrative of a pronged bowed ring of the general type disclosed and claimed in the aforesaid Wurzel Patent No. 2,755,698, for the assembly of which the herein tool was especially designed. More particularly, such a ring designated R comprises an arcuate ring body having a wide gap 11 between its open ends 12, 13 as characterizes the "open" retaining ring and being bowed about its vertical center line X—X so that it has concavo-convex shape as characterizes the bowed retaining ring. To render said ring capable of self-locking itself to the grooved shaft to which it is assembled, the ring body is provided with locking prongs 14, 15 which project from the convex face of the ring at approximately the junctions of the ends of its arcuate inner edge with the inner straight edges of the ring ends which define the aforesaid ring gap 11. The ring body 10 may also be provided as shown with horizontally aligned notches or recesses 16, 17 disposed intermediate the prongs 14, 15 for the accommodation of the end edges of the stack rod forming a component of the tool for assembling same, and it may also be provided on opposite sides of its outer periphery with coplanar side wings 18, 19 which serve to stabilize the ring when it rests on a flat surface with its convex face upwardly disposed, all as explained in the aforesaid Wurzel Patent No. 2,755,698. By design, the overall axial dimension of such a bowed ring is somewhat greater than the width of the shaft groove in which it is to be assembled, whereby when assembled the ring will exert spring pressure on the machine part for which it forms a locating shoulder when flattened between the relatively outer side wall of the ring and said machine part-end face, which latter is disposed so as to slightly overhang the inner side wall of the shaft groove as shown in FIG. 1 for example, thus to take full advantage of the axial spring action of a bowed retaining ring.

Referring now to FIGS. 1–3, a hand tool for assembling bowed open retaining rings of the type shown in FIG. 4 as herein proposed illustratively comprises a base 20 mounting an upright bracket member 21 having a forwardly angled portion to whose forward straight edge is rigidly affixed a post 22, to which the lower fixed part (the upper part not being shown) of a stack rod 23 is in turn fixed, it being observed that said stack rod depends downwardly toward the base member from the forwardly angled portion of the aforesaid bracket 21. The lower end portion of said stack rod 21 may or may not be flexible, but in either case it is adapted to mount a plurality of the bowed rings R to be assembled arranged in a vertical stack or column in which said rings are disposed with their convex sides facing upwardly and are further turned or oriented so that their gaps open forwardly and hence towards a shaft S mounting a machine part M and having a ring-receiving groove g therein, as shown in FIGS. 1 and 2, in which ring assembly is to be effected.

The base 20 is provided with a ring slideway 25 having width corresponding substantially to the width of the rings R (see FIG. 2) which extends forwardly from beneath the lower end of the stack rod 23. Said slideway is defined bottom and top by a bottom wall 26 which may comprise the upper surface of the aforesaid base 20 and a top wall 27, the latter preferably comprising the under surface of a suitably apertured cover plate 28 extending across the base member 20 and spaced upwardly therefrom an amount corresponding substantially to the axial dimension of one of the rings R in the normal or unstressed state thereof. It will be seen that the stack rod 23 extends through a relatively forward aperture provided in the top plate, which aperture is sufficiently large as also to accommodate with suitable clearance the rings of the stack or column thereof mounted on the stack rod. Thus, the ring stack is in effect supported on the bottom wall 26 of the ring slideway 25, which latter by design has width and depth corresponding to the external diameter and axial thickness of one of the retaining rings to be assembled.

As best seen in FIG. 1, the lower end of the stack rod terminates substantially at the line of the slideway top wall and thus slightly above the uppermost convex surface of the lowermost ring of the stack thereof disposed on the stack rod 23; hence the stack rod imposes no interference to forward movement of the lowermost ring of the stack thereof along the aforesaid slideway.

As illustrated in FIG. 3, the slideway is preferably provided, in its portion immediately below the stack rod and column of rings disposed thereon, with an upwardly convex ring support 30 whose upper surface is complemental to the concave under surface of the body portion of the rings R. Thus, a bowed retaining ring resting on the support 30 is supported throughout substantially its full arcuate length by a complemental supporting surface and accordingly the weight of the ring column is adequately supported without causing any deformation of the lowermost bowed ring of the column.

Mounted for reciprocatory movement in the preferably narrow-width rear end portion 25a of the main slideway 25 is a ring-pushing member hereinafter called simply a plunger 32 whose forward end portion is adapted on the working stroke thereof to be projected through a longitudinal open-top slot or groove 34 (FIG. 2) extending centrally-forwardly through the aforesaid ring-stack support 30. By design, the vertical dimension of at least said forward end portion of the plunger is such that its upper edge extends above the topmost or central crown portion of the ring stack support 30 a distance corresponding to the thickness of a single ring supported thereon. Accordingly, on each working stroke of the plunger 32 the lowermost ring of a stack thereof is pushed forwardly (in leftwise direction) from said stack as effects a ring dispensing and applying operation.

Hand-operated means for effecting reciprocation of the plunger 32 are provided, such illustratively comprising a fixed handle 34 extending rearwardly and preferably integrally from the middle portion of the upright bracket 21 and a trigger-like swing handle 35 whose hub end is pivotally connected to a rearward extension 36 of the aforesaid bracket 21 as by means of a shaft or pin 37. Said hub end is formed as a pinion segment 38 whose teeth mesh with those of an idler pinion 40 turning on a shaft 41 disposed intermediate the pinion segment and a toothed rack 42 affixed to the rearward end of the plunger 32 as shown, the teeth of said idler pinion and rack intermeshing with one another. Thus, as the trigger or handle 35 is swung towards the fixed handle 34, pinion segment 38 is turned in counterclockwise direction, as effects rotation of the idler pinion 40 in clockwise direction and movement of the plunger 32 in forward or leftwise direction, during the course of which its forward end is projected through the ring-stack support slot 34, thereby to cause corresponding forward movement of the lowermost ring of the stack along the ring slideway 25. A coil spring 44, whose ends are connected to the fixed handle 34 and to a forward point on the pinion segment 38, respectively, normally maintains the plunger 32 in its retracted position and also effects return of the plunger to that position upon the completion of its working stroke and release of the swing handle 35.

According to the invention, the forward end of the ring slideway 25 opens through a rearwardly-downwardly sloped opening 45 provided in the undersurface of the base member 20. More particularly, the underface of the forward portion of the base 20 is inclined as at 46 by a small angle to the underface 48 of the rear portion of said base member and by a corresponding angle to the bottom and top walls 26, 27 of the slideway. As is best seen in FIG. 1, the disposition of the inclined underface portion 46 is such that the slideway opens through said underface (via the aforesaid recess 45) rather than opening through the front end wall of the base plate as it would otherwise do. This arrangement provides that the slideway cover plate 28 overhangs the recess 45, consequent to the forward end of said plate being continued beyond the corresponding forward end of the slideway bottom wall, and hence that the extreme forward end of the slideway has depth which is less than the overall axial dimension of the bowed rings being assembled, such assuming that the bottom of the slideway is considered to be the plane of the inclined underface portion 46 of said base 20. By design, this lessening of the depth of the forward end of the ring slideway is such as to provide the required flattening of a bowed ring moving thereto into the groove g of the shaft S in which it is to be assembled.

According to a further feature of the invention, the forward or working end-edge portion of the tool base 20, rather than being provided with a semi-circular cut-out as enables said end to fork or straddle the shaft on which ring assembly is to be effected, as is conventional in tools and appliances of this general type, is instead provided with a full circular through-hole 50 whose axis is preferably disposed normal to the inclined underface portion 46 of the base and has diameter somewhat greater than that of shaft S, said hole permitting the forward end of the tool to be lowered onto the shaft end, rather than being moved against the same from a side of the shaft. While said hole 50 is full-circular in its upper portion such is not true for its lower end portion, as the aforesaid ring slideway 25 in effect communicates with said lower end portion whereby the ring being ejected by the plunger 32 as the latter moves throughout its working stroke may freely move into its groove in the shaft end disposed within said hole, as illustrated in FIG. 3.

In operation of the above described tool, the operator grips the same by the handles 34, 35 which he may do with one hand and thereupon proceeds to lower the tool on to the machine part M disposed on the shaft S in whose groove g ring assembly is to be effected, care being taken to relate the tool with respect to the shaft so that the latter moves into the circular opening 50 of the tool base 20 as the tool is lowered. Such will result in the inclined underface portion 46 of the tool base engaging the end face of the machine part, and hence the tool will take the inclined position shown in FIG. 3, in which the end face of the machine part engaged by the tool serves as a bottom wall for the forward end of the ring slideway 25. Now the operator presses the swing handle 35 against the action of spring 34, such resulting in the plunger 32 partaking of its working stroke, during the course of which it moves through the ring support 30 provided in said slideway 25, and pushes the lowermost ring R of the stack thereof forwardly along said slideway. It is here observed that, consequent to the rings being oriented so that their gaps open in the direction in which they are pushed by said plunger, the lowermost ring can readily disengage from the stack without being retarded by its locking prongs 14, 15, because the latter will move through the gap of the next higher ring of said stack.

In moving beneath the forward end portion of the slideway cover plate 28, which is now inclined to the machine part end face by substantially the angle that the tool as a whole is inclined thereto, said lowermost ring of the ring stack is compressed axially between the top wall (underface 27 of said cover plate) of the slideway and the machine part end face, as effects flattening the ring the requisite amount as insures its easy movement into the shaft groove g with final forward movement of the plunger. Such results in the said lowermost ring of the stack being assembled in the groove as in FIG. 3, whereupon the operator releases the swing handle 35 as effects retraction of the plunger 32. Thereupon the tool as a whole may be lifted from shaft end and now secured machine part, fully conditioned for the next ring-assembly operation.

Without further analysis, it will be appreciated that the above described and illustrated hand tool achieves in highly effective and dependable manner the objectives of the invention as above explained. More particularly, the invention provides a simple, easy-to-operate hand-tool type of bowed ring assembling device in which the ring-flattening of each said ring being assembled requisite to its assembly in its shaft groove is effected without resort to the elaborate and complicated ring-flattening means characterizing the prior apparatus used to assemble the bowed, as distinguished from the plane open retaining rings on grooved shafts and like workpieces.

As many changes could be made in carrying out the above constructions without departing from the scope of the invention, it is intended that all matter contained in the above description or shown in the accompanying drawings shall be interpreted as illustrative and not in a limiting sense.

I claim:

1. A hand tool for assembling open bowed retaining rings on grooved shafts whereon they are adapted to provide a locating shoulder for a machine part mounted on the shaft comprising, in combination, a base, an upright bracket member mounted on said base, a generally vertically disposed stack rod affixed to said bracket member and depending toward the base for maintaining a plurality of the bowed retaining rings to be assembled and which are arranged with their gaps opening forwardly and with their convex sides facing upwardly in vertical stack formation, a ring slideway formed in the base to extend forwardly from beneath the stack rod and being defined in part by bottom and top walls which are spaced apart an amount slightly in excess of the overall axial dimension of one of said bowed retaining rings and said stack rod extending through said slideway top wall but terminating above the level of the bottom wall thereof a distance corresponding generally to the spacing between said walls whereby the lowermost ring of the stack may move forwardly along the slideway from beneath the stack rod without interference from said stack rod, a ring plunger mounted for reciprocatory travel in a rearward extension of the slideway and being operative on its working stroke to push the lowermost ring of the ring stack in forward direction, hand-operated means carried by said bracket for reciprocating said plunger, the underface of the forward portion of the base being inclined by a small angle to the slideway and said slideway opening at its forward end through said inclined underface, the top wall of the slideway at its said forward end extending over the slideway opening and being disposed above the line of said inclined underface a distance which is less than the normal overall axial dimension of one of said bowed rings, the construction and arrangement being such that when the tool is cooperated with the shaft and the inclined underface of said base is pressed flat against the end face of the machine part for which the ring to be assembled forms a locating shoulder, actuation of the ring plunger means causes the lowermost ring of the stack moving forwardly from the slideway to the shaft groove to be progressively flattened as results from its being compressed axially between the top wall of the slideway and said end face by an amount such that its movement into the shaft groove is facilitated.

2. A tool according to claim 1, wherein the slideway portion beneath the stack rod is provided with a ring-stack supporting member having shape complemental to the underface of the bowed rings being assembled, and the forward end of said plunger means is projectable and retractable through said support means.

3. A tool according to claim 1, wherein said base is provided in its forward working-end portion with a circular shaft-receiving through opening which enables the tool to be moved axially onto the shaft, and said slideway also opens at its forward end into said through opening.

4. A tool according to claim 1, wherein said base is provided in its forward portion with a circular shaft-receiving through opening which enables the tool to be moved axially onto the shaft, and said slideway communicates with said shaft-receiving opening from the underside thereof, thereby allowing ejection of a ring from the slideway into the shaft groove without interference from the wall defining said opening.

5. A tool according to claim 1, wherein said plunger-actuating means comprises a swing handle and pinion-and-rack means for translating swinging movement of said handle into reciprocatory motion of the plunger.

References Cited in the file of this patent

UNITED STATES PATENTS

| | | |
|---|---|---|
| 2,315,209 | Kost | Mar. 30, 1943 |
| 2,329,275 | Lenehan | Sept. 14, 1943 |
| 2,895,214 | Erdmann | July 21, 1959 |